May 18, 1965  R. KREMP ETAL  3,183,769
AUTOMATIC LIGHT COMPENSATING STRUCTURE
FOR PHOTOGRAPHIC PROJECTORS
Filed May 14, 1962  3 Sheets-Sheet 1

INVENTOR.
RUDOLF KREMP
WILLY KADEN
BY

United States Patent Office 3,183,769
Patented May 18, 1965

3,183,769
AUTOMATIC LIGHT COMPENSATING STRUCTURE FOR PHOTOGRAPHIC PROJECTORS
Rudolf Kremp, Grunwald, near Munich, and Willy Kaden, Munich, Germany, assignors to Agfa Aktiengesellschaft, Leverkusen-Bayerwerk, Germany
Filed May 14, 1962, Ser. No. 194,382
Claims priority, application Germany, May 17, 1961, A 37,459
15 Claims. (Cl. 88—24)

The present invention relates to photographic projectors which are used to project onto a screen or the like images derived from transparencies which are placed in the projector.

More particularly, the present invention relates to the structure of such a projector which is capable of adjusting the projector so as to provide images of substantially constant light intensity irrespective of variations in the characteristics of the transparencies.

Photographic projectors have already been provided with structure capable of accomplishing these results. However, in the known structures the compensation for variations in the characteristics of the transparencies are made when the transparency is placed in the position where the image is projected by the projector, so that as a result the adjustments to provide images of substantially constant light intensity are made during at least the initial part of the projection of a particular image, and of course this means that there will be initially quite noticeable variations. For example, if a relatively dense transparency, which is to say a relatively dark transparency, is placed in the projecting position then of course the structure will operate automatically to increase the light which is used with such a transparency so as to provide an image of substantially the same light intensity as one derived from a different transparency which is of relatively low density or in other words which is relatively light, but since these adjustments are made when the transparency is in the projecting position it is clear that the initial part of the projection will have fluctuations in the light intensity.

It is accordingly a primary object of the present invention to provide a photographic projector of the above type which will automatically compensate for variations in the densities of transparencies which are projected, but which will make these compensations before the image is actually projected onto the screen, so that in this way the screen or the like receives only images of substantially constant light intensity and there are no visible variations taking place on the screen itself in order to compensate for variations in the densities of the transparencies.

Another object of the present invention is to provide an automatic compensating structure of the above type which is capable of being used with all sizes of transparencies so that it is not necessary to limit the use of the automatic compensating structure to transparencies of a given size or format.

An additional object of the present invention is to provide an automatic compensating structure of the above type which operates with extreme rapidity, so that even with projectors where the transparencies are moved very quickly to the projecting position the structure of the invention will nevertheless be capable of making the necessary compensating adjustments before the image is projected onto the screen.

It is furthermore an object of the present invention to provide an automatic compensating structure of the above type which is capable of making one or more compensating adjustments on the projector in order to provide images of substantially constant light intensity.

It is furthermore an object of the present invention to provide a structure capable of accomplishing the above objects and at the same time composed of simple rugged elements which are very reliable in operation.

Furthermore, the object of the present invention includes a structure which is fully automatic to the extent that the operator will operate the projector in a purely convenitonal manner without even being conscious of the fact that compensations are being made by the structure of the invention.

With the above objects in view the invention includes in a photographic projector, a guide means for guiding a transparency to and from a projecting position, and the photographic projector includes a projecting means for projecting an image of a photograph carried by the transparency when the transparency is in this projecting position. In accordance with the present invention a sensing means is located along the path of movement of the transparency to its projecting position to sense the density thereof, and an adjustable means is automatically operated by the sensing means in accordance with the density sensed thereby, this adjustable means cooperating with the projector means to adjust the latter so as to provide successive images of substantially constant light intensity from successive transparencies irrespective of variations in the densities of the transparencies. It is pointed out that the term "density" of a light transparency is used to signify the darkness or lightness of the photograph thereon. Thus, where a relatively light transparency is to be projected it will necessarily require a small amount of light to provide an image whose light intensity will be the same as that derived from a relatively dark transparency which will require substantially more light to provide an image of the same brightness. Thus, a relatively dense transparency will be relatively dark while a less dense transparency will be relatively light. Moreover, the term "transparency" is intended to refer to any photograph through which light can pass, whether this be in the form of a diapositive, a glass slide, or the like.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Figure 1:
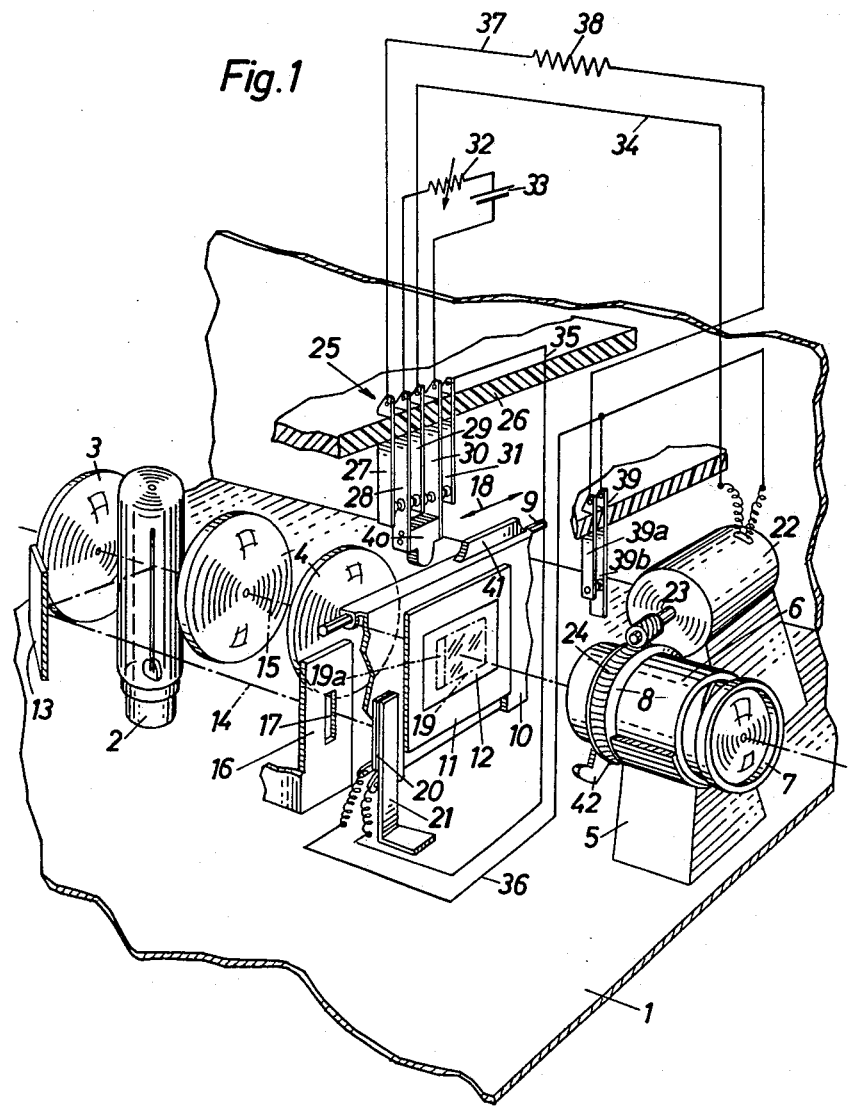
FIG. 1 shows fragmentarily a part of a photographic projector, and in FIG. 1 the structure of the invention is illustrated, in part diagrammatically, in a partly sectional and a perspective view.

Referring now to FIG. 1, there is fragmentarily shown therein a housing 1 of a photographic projector, and the housing 1 carries the projection lamp 2 behind which is located the hollow reflector 3 which directs light which moves rearwardly from the lamp 2 forwardly along the optical axis. Ahead of the lamp 2 are located the pair of condenser lenses 4, and in front of these condenser lenses is located a stationary support 5 which fixedly carries a tube 6 in which the objective 7 is axially shiftable in a manner well-known in the art. Moreover, the tube 6 turnably supports a rotary member 8 which is connected to any known structure of the projector for controlling the amount of light passing therethrough. For example, the rotary member 8 can be connected in a manner well-known to the art to a rotary diaphragm ring for turning the diaphragm ring and thus adjusting the size of the aperture of the objective through which light passes, so that in accordance with the angular position of the rotary member 8 more or less light will pass through the objective. It is clear that the rotary member 8 forms an adjustable means which is capable of being adjusted to increase or decrease the intensity of the light which provides the image which appears on the projection screen or the like. It is emphasized, however, that adjustment of the light intensity of the image on the screen or the like can be provided in other ways than adjusting the diaphragm. For example, as will be apparent from the description below, it is also possible to adjust the voltage applied to the lamp 2, so that in this way the light which is put out by the lamp 2 can have its intensity increased or decreased, and in this way also it is possible to regulate the light intensity of the images.

A guide means is provided for guiding each transparency to a projection position where an image of the photograph carried thereby is projected, and this guide means includes the elongated stationary rod 9 which extends transversely across the optical axis, as clearly indicated in FIG. 1. This guide means further includes the transparency carrier 10 which is provided with a pair of ears formed with openings through which the rod 9 passes, so that in this way the transparency carrier 10 and the rod 9 form a guide means guiding the transparency for movement along a predetermined path toward and away from the projection position, and of course the carrier 10 is moved back and forth along the rod 9 by a driving structure well-known in the art and not forming part of the present invention, so that the drive which moves the carrier 10 at a predetermined rate of speed along the rod 9 toward and away from the projecting position is not shown in the drawing. A suitable driving structure is shown for example in U.S. Patent 2,949,814 (Boughthon et al.). The transparency carrier 10 is moved away from the position shown in FIG. 1, which is the projecting position, to an opposite end position where the carrier 10 is located over the magazine in which the several transparencies are located, and in a manner well-known in the art the transparency which has just had its photograph projected is removed from the carrier 10 and is replaced by the next transparency whereupon the carrier 10 is shifted back to the projecting position by the unillustrated driving structure referred to above. The transparency carrier 10 is shown in FIG. 1 carrying a transparency which is composed of the inner portion 12 which carries the photograph and the outer frame portion 11 which surrounds and carries the inner portion 12. This inner portion 12 may be in the form of film which is provided with the photograph, although any other type of transparency may be used, as pointed out above.

Part of the light which issues from the lamp 2 is reflected by the reflector 13, carried by a stationary part of the housing 1, forwardly along the path 14 which extends parallel to the optical axis 15, and the reflector 13 is located to one side of the lamp 2, so that this reflector 13 changes the direction of light issuing laterally from the lamp 2 by an angle of 90° along the line 14. This light which is reflected by the reflector 13 is received by a sensing means of the invention. The sensing means includes a stationary mask 16 formed with an elongated slot 17 which extends vertically, as viewed in FIG. 1, so that this slot 17 is in fact perpendicular to the rod 9 as well as to the direction of movement of the transparency, this direction being indicated by the double-headed arrow 18. The elevation of the slot 17 is such that it is located between the elevations of the upper and lower edges of the transparency portion 12, and it will be noted that during movement of the carrier 10 of the guide means 9, 10 the transparency moves past the mask 16 so that the light which is guided along the path 14 will pass through the slot 17 and then through the transparency 12. The elevation of the slot 17 is such that the upper and lower portions of the transparency 12 extend beyond the ends of the slot 17 by a substantially equal distance, so that it fact the slot 17 is fairly well centered with respect to the upper and lower edges of the transparency. The length of the slot 17 corresponds to the height of the area 19 shown in dot-dash lines on the transparency 12. The width of the slot 17, on the other hand, is but a small fraction of the width of the area 19.

The sensing means includes in addition to the mask 16 a photosensitive transducer means 20 in the form, for example, of a photocell which is carried by the stationary carrier 21. The photocell 20 is aligned with the slot 17 so as to receive the light rays which pass therethrough, and the mask 16 and the photocell 20 are respectively located on opposite sides of the path of movement of the transparency 12, so that this transparency 12 necessarily passes between the slot 17 and the photosensitive transducer means 20, and in this way the sensing means 16, 20 is located along the path of movement of the transparency provided by the guide means 9, 10. Thus, during movement of the transparency 12 between the mask 16 and the photocell 20 the light which passes through the slot 17 will first pass through the transparency 12 before reaching the photocell 20, and the width of the slot 17 is equal to the width of the area 19a indicated on the measuring field 19 shown in dot-dash lines in FIG. 1, so that at any given instant while the transparency is between the mask 16 and the photocell 20 the light will be passing through an area indicated by the area 19a of the transparency 12. The height of the area 19 is of course determined by the length of the slot 17, as described above, and the width of the area 19 is determined in a manner described below. It is apparent, therefore, that as the transparency 12 moves through the gap between the mask 16 and the photocell 20 there will be successive areas 19a distributed across the total area 19, and by integrating the individual readings taken for the successive areas 19a it is possible to obtain an extremely accurate value for the average density of the area 19, and this integration can be obtained very accurately because the structure which moves the transparency to the projecting position transports the transparency at a given rate of speed so that it is possible to obtain an accurate value of the density of the area 19. In the particular example illustrated the measuring field 19 has a size of approximately 20 x 24 mm., and this measuring area may be used for transparencies of different sizes and formats, even for a transparency having a 4 x 4 cm. format, since even in this latter case the measuring field will include the important central portion of the transparency which is the critical part thereof which should be used as a basis for determining the proper light intensity.

Assuming that the lamp 2 provides an illumination of a constant intensity, it is possible to provide for the rotary member 8, which sets the diaphragm, for example, settings which respectively correspond to readings taken from the measuring field 19 so that the brightness of the image of the area 19 on the screen will remain constant. The part of the transparency which surrounds the area 19 is of only minor importance so that an accurate adjustment of the light intensity with respect to this surrounding area of the transparency is not required.

In order to automatically adjust the rotary member 8 in accordance with readings taken from the area 19, the sensing means 16, 20 is connected to the adjustable means 8 by an electrical structure which includes a reversible electric motor 22 which acts as an integrating motor, and the outer periphery of the rotary member 8 is formed as a worm wheel 24 meshing with a worm 23 driven by the motor 22 so that when the motor 22 operates it will turn the rotary member 8. Of course, the worm wheel 24 may be in the form of a separate ring which is fixed to the adjusting ring 8.

The electrical means which interconnects the sensing means 16, 20 with the adjustable means 8 includes in addition to the reversible motor 22 an electrical circuit which includes the switch 25 made up of five elongated springy contact members carried by the stationary wall 26 made of an electrically non-conductive material. As is shown in FIG. 1, the elongated springy switch members 27–31 are carried by and extend downwardly from the horizontal wall 26. The pair of springy contact members 28 and 30 are connected to each other by a circuit which includes the adjustable resistor 32, and in this circuit is also located the battery 33. The switch member 29 is connected by a lead 34 directly to the motor 22. A lead 35 extends from the switch member 31 to the photosensitive transducer means 20, and a second lead 36 interconnects the transducer means 20 with the other pole of the motor 22. A lead 37 is connected to the switch member 27 and a resistor 38 which is fixed is located in the lead 37, this lead 37 serving to connect the switch member 27 to a switch member 39a of a second switch 39, this switch 39 including also the switch member 39b which is connected electrically to the lead 36 and thus also to the motor 22. The free lower end portions of the pair of switch members 28 and 30 are fixed to each other by a block 40 of electrically non-conductive material, as by being riveted to the latter, for example, and the lower end portion of the block 40 is located in the path of movement of an elongated cam 41 which is fixedly carried by the transparency carrier 10 of the guide means 9, 10.

When the transparency moves along the path provided by the guide means 9, 10 to the projecting position shown in FIG. 1, the cam 40, as soon as the right edge of the area 19, as viewed in FIG. 1, is aligned with the slot 17, is moved by the cam 41 to the right, as viewed in FIG. 1, and the cam 40 is held in this position displaced to the right from the position shown in FIG. 1 as long as the elongated cam strip 41 remains in engagement with the block 40. Thus, it is the length of the cam strip 41 which determines the length of the area 19, and the positioning of the cam strip 41 on the carrier 10 is such that the area 19 is also centered horizontally with respect to the transparency 12. The displacing of the block 40 to the right, as viewed in FIG. 1, places the contact 28 in electrical engagement with the contact 29 and the contact 30 in electrical engagement with the contact 31. The result is that the circuit which includes the photocell 20 and the motor 22 is closed, and the current which results from the passage of light through the slot 17 and through the area 19 to the photocell 20 serves to drive the motor 22 which thus turns the adjustable means 8 so that the diaphragm is closed to an extent which is determined by the density of the measuring area 19 of the particular transparency, and it will be noted that this adjustment is made before the transparency reaches the projecting position.

When the transparency is transported back to its starting position the elongated camming strip 41 displaces the block 40 to the left, as viewed in FIG. 1, so that now the contact 28 engages the contact 27 while the contact 30 engages the contact 29. Of course, as soon as the strip 40 moved to the right, as viewed in FIG. 1, beyond the block 40 the switch 25 returned to its rest position and the motor 22 stopped operating. The result of shifting of the block 40 to the left, as viewed in FIG. 1, is that the polarity of the motor 22 is reversed and it therefore runs in the opposite direction so as to drive the rotary member 8 back toward its starting position. When the rotary member 8 is almost back to its starting position, a projection 42 which is carried by and turns with the rotary member 8 engages the springy contact member 39b of the switch 39 to displace this springy contact member 39b away from the contact member 39a and thus open the switch 39 so that in this way the return movement of the rotary member 8 is automatically stopped by de-energizing of the motor 22 precisely when the rotary member 8 reaches its starting position. All of the above operations are repeated for each transparency. As soon as the camming strip 41 moves beyond the block 40 in one direction or the other the switch 25 automatically returns to its rest position where none of the springy contacts thereof are in engagement with each other.

The variable resistor 32 can be adjusted so as to provide a desired light intensity for the image on the screen, and this adjustment may be carried out by hand before a series of transparencies are projected. It is also possible to couple the structure which adjusts the variable resistor 32 with the objective 7, so that during shifting of the objective variations in the brightness of the image will be automatically compensated for. It is also possible to provide a pair of variable resistors one of which is coupled to the objective and the other of which is manually adjusted. The electrical circuit in which the lamp 2 is located is of no significance in the embodiment of FIG. 1 and therefore is not shown.

Figure 2:
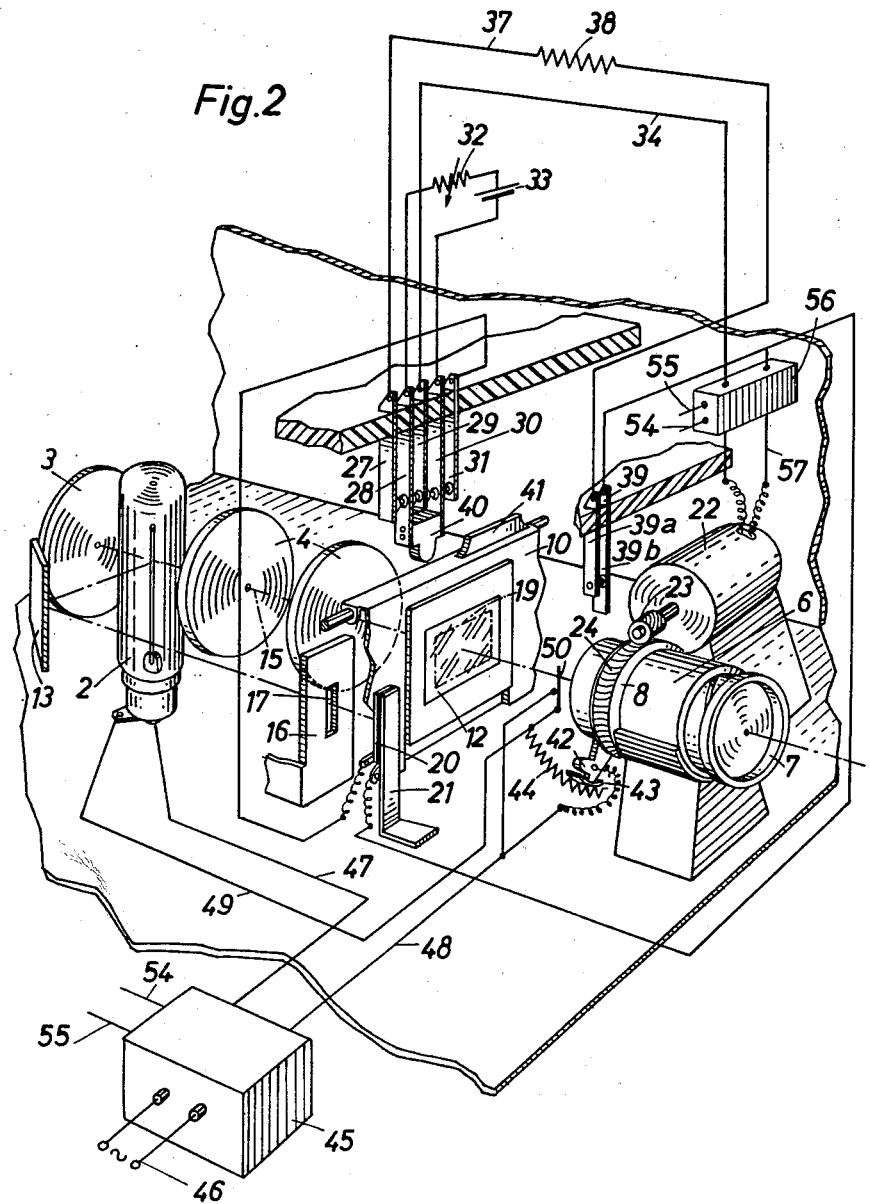
FIG. 2 shows a structure of the invention which differs from that of FIG. 1, so that the embodiment of FIG. 2 is different from that of FIG. 1.

In the embodiment of the invention which is illustrated in FIG. 2 the parts which are identical with those of FIG. 1 described above are indicated by the same reference characters. In the embodiment of FIG. 2 the rotary adjusting member 8 is connected with the sliding contact 43 of a variable resistor, this contact 43 moving along the resistor 44 which is located in the circuit through which current is supplied to the projection lamp 2. A control device 45, of known construction, can be built into the projector housing and is provided with a pair of leads 46 which can be connected to a source of alternating current. The control 45 is connected through the lead 47 with the lamp 2, and by way of the lead 48 the control assembly 45 is connected with the sliding contact 43. Furthermore the control device 45 is connected by means of leads 54 and 55 with an amplifier 56, included in leads 34 and 57 and connected thereby with the motor 22. A lead 49 interconnects the lamp 2 with one end of the resistor 44. The leads 48 and 49 are interconnected by way of a switch 50 when the latter is closed, and the switch 50 is located in the path of movement of the transparency carrier 10 which only opens the switch 50 when the transparency 12 has reached the projecting position. In this way, the variable resistor 43, 44 is not located in the circuit of the lamp 2 while a reading of the density of the area 19 is taken by the photocell 20, and thus the rotary member 8, which is adjusted in the embodiment of FIG. 2 in exactly the same way as described above in connection with FIG. 1, is adjusted during a time when the lamp 2 provides a constant light intensity which is not influenced by the variable resistor assembly 43, 44. The voltage applied to the lamp 2 is determined by the control device 45 and this voltage is of course maintained at a constant value uninfluenced by the variable resistor 43, 44 during movement of the transparency 12 between the mask 16 and the photocell 20. Thus, with the embodiment of FIG. 2, the rotary member 8, instead of being connected to the diaphragm, is connected with the variable resistor 43, 44 which can be regulated to adjust the intensity of the illumination provided by the lamp 2, and it will be noted that the adjusted illumination provided to compensate for variations in the density of the transparency is not provided until the transparency reaches the projecting position, since it is only at this time that the switch 50 is opened so as to place the variable resistor 43, 44 in the circuit of the lamp 2. Of course, it is also possible to connect the rotary member 8 with the diaphragm so that in such a case both the diaphragm and the lamp voltage will be simultaneously and continuously adjusted. As compared to the embodiment of FIG. 1, it will then be necessary to change only the transmission ratio between the worm 23 and the worm wheel 24.

Figure 3:
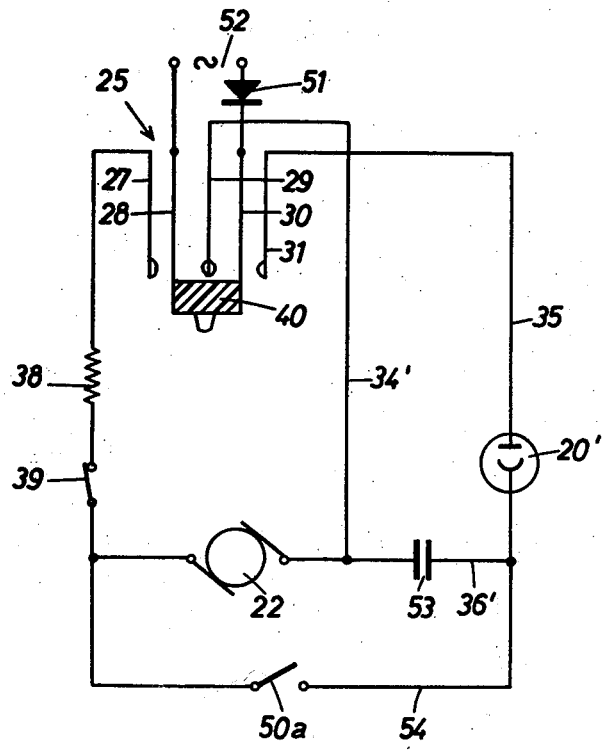
FIG. 3 is an electrical wiring diagram showing a further variation of the structure of the invention.

According to the embodiment which is shown in FIG. 3, all of the above-described structure remains the same except that the contact 28 of the switch 25 is connected directly with a source of alternating current 52 while the contact 30 is connected to the source of alternating current 52 through a rectifier 51. The lead 34' interconnects the contact 29 with the motor 22 as well as with a condenser 53 which is connected by a lead 36' with a vacuum photocell 20' which is in turn connected by the lead 35 with the contact 31. When, during measurement of the density of the area 19, the block 40 is shifted to the right, as viewed in FIG. 3, the condenser 53 is charged by the current which is derived from the vacuum photocell 20', and this current which is derived from the vacuum photocell 20' is independent of the voltage which is supplied to the cell 20' as well as independent of the voltage applied to the condenser 53. This charging of the condenser takes place without any delay or lag so that the condenser 53 can be charged in this way even when the drive for the transparency operates to move the transparency to and from the projecting position at an extremely high rate of speed. With this embodiment the charge of the condenser at the end of the measuring cycle is an accurate factor for determining the amount of light which should pass through the field 19 so as to provide an image of constant light intensity irrespective of variations in the density of the area 19.

With the embodiment of FIG. 3 the transparency carrier 10, as it approaches the projecting position, instead of opening a switch 50 as shown in FIG. 2, will close the switch 50a shown in FIG. 3, the operating member of the switch 50a being located in the path of movement of the transparency 10 so as to be closed by the carrier 10 just before the latter reaches the projecting position, and in this way the circuit which includes the condenser 53 and the motor 22, this circuit including the lead 54 which connects the switch 50a to the condenser 53, will be closed so that the condenser 53 will discharge in order to drive the motor 22 which operates in the manner described above so as to turn the rotary member 8 for adjusting either the diaphragm or the voltage on the lamp 2, or both. There is of course more time available for driving the motor 22 by the discharge of the condenser 53 than for charging the condenser 53, since this latter charging takes place during movement of the transparency in the gap between the mask and the photocell 20', but if it is desired to avoid even the period of time required for discharging of the condenser 53 after the area 19 moves beyond the photocell 20', it is possible to arrange the parts so that the switch 50a will be closed at the beginning of the measurement of the area 19 so that the motor 22 operates immediately and its operation continues throughout the period when the area 19 is being measured, the motor 22 continuing to operate until the very quickly charged condenser 53 has become discharged.

The resistor 38 and the switch 39 shown in FIG. 3 correspond to the resistor 38 and switch 39 shown in FIGS. 1 and 2, and the embodiment of FIG. 3 is constructed in precisely the same way as the embodiments of FIGS. 1 and 2, except for the differences noted above.

It will be noted that with all of the embodiments of the invention described above, the diaphragm and/or the lamp voltage has been so regulated by the time that the projecting of the image begins, that the illumination of the screen or the like has already been adjusted with respect to the density of the transparency before the actual projection begins and without requiring any manual operations on the part of the operator.

Most photographic projectors include a shutter flap which is moved to an open position in order to initiate the projection of an image onto a screen or the like, and the automatic adjustments carried out with the structure of the invention are made before such a shutter flap is moved to its open position.

In order that the same structure of the invention can be used with transparencies of different sizes and formats, the size and location of the slot 17 is made so that it will be proper for the smallest transparency and then even though larger transparencies are used a reading will still be taken of a central portion of the transparency which includes the most important part thereof. For example, with transparencies of 40 x 40 mm., 24 x 36 mm., 24 x 24 mm. and 18 x 24 mm., these dimensions for each format being respectively the height and width thereof, the length of the slot 17 would be 18 mm. and it will be noted that with this arrangement no change is required in the structure of the invention in order to take proper readings for all of these sizes. The projectors are in general designed for smaller formats, so that the measuring field will be suitable also for the largest format which can be used with the projector.

It will be understood that each of the elements described above, or two or more together, may also find a useful application in other types of projectors differing from the types described above.

While the invention has been illustrated and described as embodied in automatically adjustable projectors, it is not intended to be limited to the details shown, since various modifications and structural changes may be made without departing in any way from the spirit of the present invention as defined in the claims.

What is claimed as new and desired to be secured by Letters Patent is:

1. In a photographic projector, in combination, guide means for guiding a transparency for movement along a given path to and from a projecting position; projecting means for projecting an image of a photograph carried by said transparency onto a screen or the like when said transparency is in said projecting position; a mask and a photosensitive transducer means respectively located on opposite sides of said path, said guide means guiding the transparency for movement along said path between said mask and said photosensitive transducer means and said mask being formed with an elongated slot through which light passes to reach said photosensitive transducer means, the light which passes through said slot passing also through the transparency while the latter is moving along said path between said mask and said photosensitive transducer means and said slot being elongated and extending in a direction generally transverse to the direction of movement of the transparency along said path and said slot having a width which is substantially smaller than the length of the transparency in the direction of its path of movement to and from said projecting position; and adjustable means cooperating with said projecting means for adjusting the light intensity with which an image is projected by said projecting means onto a screen or the like, said photosensitive transducer means being operatively connected to said adjustable means for adjusting the latter to provide images of substantially constant light intensity irrespective of variations in the densities of the transparencies from which said images are derived.

2. In a photographic projector, in combination, guide means for guiding a transparency for movement along a given path to and from a projecting position; projecting means for projecting an image of a photograph carried by said transparency onto a screen or the like when said transparency is in said projecting position; a mask and a photosensitive transducer means respectively located on opposite sides of said path, said guide means guiding the transparency for movement along said path between said mask and said photosensitive transducer means and said mask being formed with an elongated slot through which light passes to reach said photosensitive transducer means, the light which passes through said slot passing also through the transparency while the latter is moving along said path between said mask and said photosensitive transducer means and said slot being elongated and extending in a direction generally transverse to the direction of movement of the transparency along said path and said slot having a width which is substantially smaller than the length of the transparency in the direction of its path of movement to and from said projecting position, said slot having a length which is smaller than the dimension of the transparency in the same direction that said slot extends and portions of the transparency extending beyond the ends of the slot during movement of the transparency to said projecting position; and adjustable means cooperating with said projecting means for adjusting the light intensity with which an image is projected by said projecting means onto a screen or the like, said photosensitive transducer means being operatively connected to said adjustable means for adjusting the latter to provide images of substantially constant light intensity irrespective of variations in the densities of the transparencies from which said images are derived.

3. In a photographic projector, in combination, guide means for guiding a transparency along a given path to and from a projecting postion; projecting means for projecting an image of the transparency onto a screen or the like when the transparency is in said projecting position; photosensitive means located along the path of movement of the transparency for sensing the density thereof during movement of the transparency to said projecting position; adjustable means for adjusting the light intensity of images projected by said projecting means; and electrical means connecting said photosensitive sensing means to said adjustable means for automatically adjusting the latter according to the density sensed by said sensing means to provide substantially constant light intensity of the images irrespective of variations in the densities of the transparencies, said electrical means including a switch located in the path of movement of a part of said guide means which carries a transparency during movement thereof along said path, said switch being automatically actuated by said part of said guide means to close the circuit between said sensing means and said adjustable means for actuating the latter to provide the desired light intensity when the image is projected.

4. In a photographic projector, in combination, an elongated guide member; transparency carrying means guided by said guide member for movement along a given path to carry a transparency to and from a projecting position; projecting means for projecting an image of the transparency when the latter is in said projecting position; elongated cam means carried by said transparency carrier means and having a length shorter than the length of a transparency in the direction of movement thereof to and from said projecting position; an electrical circuit including a switch means actuated by said elongated cam so that the switch means is actuated for a length of time shorter than that required for the entire transparency to move past said switch means; and photosensitive sensing means and adjustable means connected electrically with each other by said electrical circuit, said photosensitive sensing means sensing the density of a transparency as it moves to said projecting position and said adjustable means adjusting said projecting means to adjust the light intensity of an image projected thereby, said sensing means through said electrical circuit actuating said adjustable means to adjust said projecting means to provide images of substantially constant light intensity irrespective of variations in the densities of the transparencies.

5. In a photographic projector, in combination, an elongated guide member; transparency carrying means guided by said guide member for movement along a given path to carry a transparency to and from a projecting position; projecting means for projecting an image of the transparency when the latter is in said projecting position; elongated cam means carried by said transparency carrier means and having a length shorter than the length of a transparency in the direction of movement thereof to and from said projecting position; an electrical circuit including a switch means actuated by said elongated cam so that the switch means is actuated for a length of time shorter than that required for the entire transparency to move past said switch means; and photosensitive sensing means and adjustable means connected electrically with each other by said electrical circuit, said photosensitive sensing means sensing the density of a transparency as it moves to said projecting position and said adjustable means adjusting said projecting means to adjust the light intensity of an image projected thereby, said sensing means through said electrical circuit actuating said adjustable means to adjust said projecting means to provide images of substantially constant light intensity irrespective of variations in the densities of the transparencies, said cam cooperating with said switch means during return of said transparency carrier means to move said transparency away from said projecting position thereof for returning said adjustable means to a predetermined initial position thereof.

6. In a projector as recited in claim 4, said switch means including three elongated switch members connected to a stationary part of the projector and a pair of movable switch members alternating with said stationary members and actuated by said cam means to be moved into and out of contact with selected ones of said stationary switch members.

7. In a photographic projector as recited in claim 5, said switch means including three springy contact members having free end portions and a pair of springy contact members alternating with said three contact members, and said switch means including an electrically non-conductive member connected to free ends of said pair of springy contact members for moving them simultaneously in one direction during movement of said transparency to said projecting position and in an opposite direction during movement of said transparency away from said projecting position, said cam which is carried by said transparency carrier means cooperating with said non-conductive member to move said pair of switch members first in said one and then in said other direction.

8. In a photographic projector, in combination, guide means for guiding a transparency along a given path to and from a projecting position; projecting means for projecting an image of a photograph carried by said transparency onto a screen or the like when said transparency is in said projecting position; adjustable means cooperating with said projecting means for adjusting the light intensity with which an image is projected thereby said adjustable means having a predetermined starting position; reversible motor means operatively connected to said adjustable means for displacing the latter from said starting position during operation of said motor means in one direction and back to said starting position during operation of said motor in a reverse direction; sensing means located along the path of movement of the transparency for sensing the density thereof during movement of the transparency to said projecting position; and control means connecting said sensing means to said motor for operating the latter to displace said adjustable means from said starting position to an extent determined by the density sensed by said sensing means and before an image is projected for providing a substantially constant light intensity for images projected by said projecting means irrespective of variations in the densities of the transparencies, said control means providing operation of said motor in said reverse direction for returning said adjustable means back to said starting position thereof after an image is projected and before the next transparency is sensed by said sensing means.

9. In a photographic projector, in combination, guide means for guiding a transparency for movement along a given path to and from a projecting position; projecting means for projecting an image of a photograph carried by said transparency onto a screen or the like when said transparency is in said projecting position; adjustable means for adjusting said projecting means to adjust the intensity of the light of the image projected thereby; reversible motor means operatively connected to said adjusting means for displacing the latter from a given starting position in one direction and for then returning said adjustable means to said starting position upon reversal of the reversible motor; and sensing means located along said path for sensing the density of a transparency during movement thereof to said position, said sensing means being connected by an electrical circuit to said reversible motor for moving the latter to displace said adjustable means from said starting position in said one direction to a predetermined extent determined by the density of the transparency, whereby images provided by said projecting means will have a substantially constant light intensity irrespective of variations of the densities of successive transparencies; and a switch located in the path of movement of said adjustable means to be opened thereby when said adjustable means is returned to said starting position during movement of the transparency away from said projecting position thereof, the opening of said switch by said adjustable means when the latter returns to said starting position opening the electrical circuit to terminate the operation of said reversible motor.

10. In a photographic projector, in combination, guide means for guiding a transparency along a given path to and from a projecting position; projecting means for projecting an image of a photograph carried by said transparency onto a screen or the like when said transparency is in said projecting position thereof, said projecting means including a rotary member turnable from a predetermined starting position about the optical axis of said projecting means for adjusting the intensity of an image projected thereby; a reversible motor operatively connected to said rotary member for turning the latter first in one direction from said starting position and then in an opposite direction back to said starting position; and sensing means for sensing the density of a transparency as it moves to said projecting position, said sensing means being operatively connected to said motor for actuating the same to turn said rotary member in said one direction to an extent determined by the density of the transparency, so that said projecting means will provide images of substantially constant light intensity irrespective of variations in the densities of the transparencies, said reversible motor turning said rotary member in the reverse direction back to said starting position thereof during movement of the transparency away from said projecting position.

11. In a photographic projector as recited in claim 10, said rotary member being operatively connected to a device such as a diaphragm for reducing the extent to which light is transmitted by said projector means.

12. In a photographic projector, in combination, guide means for guiding a transparency along a given path to and from a projecting position; projecting means for projecting an image of a photograph carried by said transparency onto a screen or the like when said transparency is in said projecting position thereof, said projecting means including a rotary member turnable from a predetermined starting position about the optical axis of said projecting means for adjusting the intensity of an image projected thereby; a reversible motor operatively connected to said rotary member for turning the latter first in one direction from said starting position and then in an opposite direction back to said starting position; and sensing means for sensing the density of a transparency as it moves to said projecting position, said sensing means being operatively connected to said motor for actuating the same to turn said rotary member in said one direction to an extent determined by the density of the transparency, so that said projecting means will provide images of substantially constant light intensity irrespective of variations in the densities of the transparencies, said reversible motor turning said rotary member in the reverse direction back to said starting position thereof during movement of the transparency away from said projecting position, said reversible motor being an integrating motor for integrating density values sensed by said sensing means during movement of a transparency to said projecting position.

13. In a photographic projector, in combination, guide means for guiding a transparency along a given path to and from a projecting position; projecting means for projecting an image of a photograph carried by said transparency when the latter is in said projecting position, said projecting means including a projection lamp; an electrical circuit in which said lamp is located, said electrical circuit including a variable resistor; a rotary member forming part of said projecting means and operatively connected to said variable resistor for setting the latter in accordance with the angular position of said rotary member; and sensing means located in the path of movement of the transparency for sensing the density thereof as the transparency moves to said projecting position, said sensing means being operatively connected to said rotary member for turning the latter to an angular position determined by the density of the transparency, whereby the variable resistor will adjust the lamp of the projecting means to provide images of substantially constant intensity irrespective of variations in the densities of the transparencies.

14. In a photographic projector, in combination, guide means for guiding a transparency along a given path to and from a projecting position; projecting means for projecting an image of a photograph carried by said transparency when the latter is in said projecting position, said projecting means including a projection lamp; an electrical circuit in which said lamp is located, said electrical circuit including a variable resistor; a rotary member forming part of said projecting means and operatively connected to said variable resistor for setting the latter in accordance with the angular position of said rotary member; sensing means located in the path of movement of the transparency for sensing the density thereof as the transparency moves to said projecting position, said sensing means being operatively connected to said rotary member for turning the latter to an angular position determined by the density of the transparency, whereby the variable resistor will adjust the lamp of the projecting means to provide images of substantially constant intensity irrespective of variations in the densities of the transparencies; and switch means bridging said variable resistor to eliminate the latter from the electrical circuit when said switch means is closed, said switch means remaining closed while said sensing means senses the denity of a tranparency and said guide means opening said switch means only when said transparency is in said projecting position thereof, so that during the actual projection of an image the voltage of the lamp is regulated by said variable resistor.

15. In a photographic projector, in combination, guide means for guiding a transparency along a given path to and from a projecting position; projecting means for projecting an image of a photograph carried by the transparency when the latter is in said projecting position, said projecting means being adjustable from a predetermined starting position to provide an adjustable light intensity of the image projected thereby; sensing means located along said given path for sensing the density of a transparency during movement thereof to said position; an electrical condenser operatively connected to said sensing means to be charged thereby to an extent determined by the density sensed by said sensing means; and electrical means operatively connected to said projecting means for adjusting the intensity with which the latter projects an image, said electrical means being operatively connected to said condenser to receive energy therefrom when the condenser is discharged after the density has been sensed by said sensing means, whereby the projecting means will automatically provide images of substantially constant light intensity irrespective of variations in the densities of the images, said electrical means displacing said projecting means from said starting position in accordance with the energy received from said condenser and before an image is projected and said electrical means returning said projecting means back to said starting position after projection of an image and before the next transparency is sensed by said sensing means; an electrical circuit including said condenser and a switch which is closed by said guide means immediately after said sensing means has sensed the density of a transparency and the electrical means for adjusting said projecting means including an integrating motor also located in the circuit of the condenser and said switch to be operated from the charge of the condenser when said switch is closed said motor of said electrical means being reversible and displacing said projecting means away from and back to said starting position thereof.

References Cited by the Examiner

UNITED STATES PATENTS

| | | | |
|---|---|---|---|
| 947,490 | 1/10 | Gwozdz | 88—24 |
| 1,925,355 | 9/33 | Whitson | 95—75 |
| 2,023,065 | 12/35 | Conrad et al. | 88—24 X |
| 2,413,218 | 12/46 | Coroniti | 95—75 |
| 2,464,162 | 3/49 | Tuttle | 88—24 |
| 2,472,815 | 6/49 | Fleming | 250—205 |
| 2,607,266 | 8/52 | Rabinowitz | 88—24 |
| 2,764,060 | 9/56 | Horak | 88—24 |
| 2,835,165 | 5/58 | Smith | 88—24 |

FOREIGN PATENTS 899,429  12/53  Germany.

NORTON ANSHER, *Primary Examiner.*

EMIL G. ANDERSON, *Examiner.*